United States Patent
Lagier et al.

[15] 3,658,683
[45] Apr. 25, 1972

[54] METAL RECOVERY APPARATUS AND METHOD

[72] Inventors: Gary G. Lagier, San Jose; Raymond L. Fuess, Palo Alto, both of Calif.

[73] Assignee: Omnific Research and Development Center, Inc., Mountain View, Calif.

[22] Filed: May 1, 1970

[21] Appl. No.: 33,760

[52] U.S. Cl. ..........................204/272, 204/275, 204/278, 204/109, 204/229
[51] Int. Cl. .................................B01k 1/00, C23b 5/00
[58] Field of Search ......................204/228–231, 272, 204/275, 278

[56] References Cited

UNITED STATES PATENTS

| 1,251,302 | 12/1917 | Toirrton | 204/110 |
| 3,510,413 | 5/1970 | Lindau | 204/109 |
| 3,524,805 | 8/1970 | Engelman | 204/228 |
| 3,551,318 | 12/1970 | Snook et al. | 204/228 |
| 1,885,702 | 11/1932 | Fink | 204/229 X |
| 3,361,663 | 1/1968 | Murray et al. | 204/278 |
| 3,385,779 | 5/1968 | Nishiba et al. | 204/272 |
| 3,468,775 | 9/1969 | Lanning et al. | 204/228 X |

*Primary Examiner*—F. C. Edmundson
*Attorney*—Townsend and Townsend

[57] ABSTRACT

Apparatus and a method for removing a metal from solutions, such as silver from a hypo solution, wherein the solution is caused to circulate in a closed fluid circuit containing a globular space across which a potential gradient is maintained, thus causing a current flow when the solution flows through the space, whereby metal is separated from the solution by an electrolytic action. Access to the space can be had to retrieve the recovered metal and the process can be automated to minimize manual functions.

13 Claims, 3 Drawing Figures

INVENTORS
GARY G. LAGIER
RAYMOND L. FUESS

BY *Townsend and Townsend*

ATTORNEYS

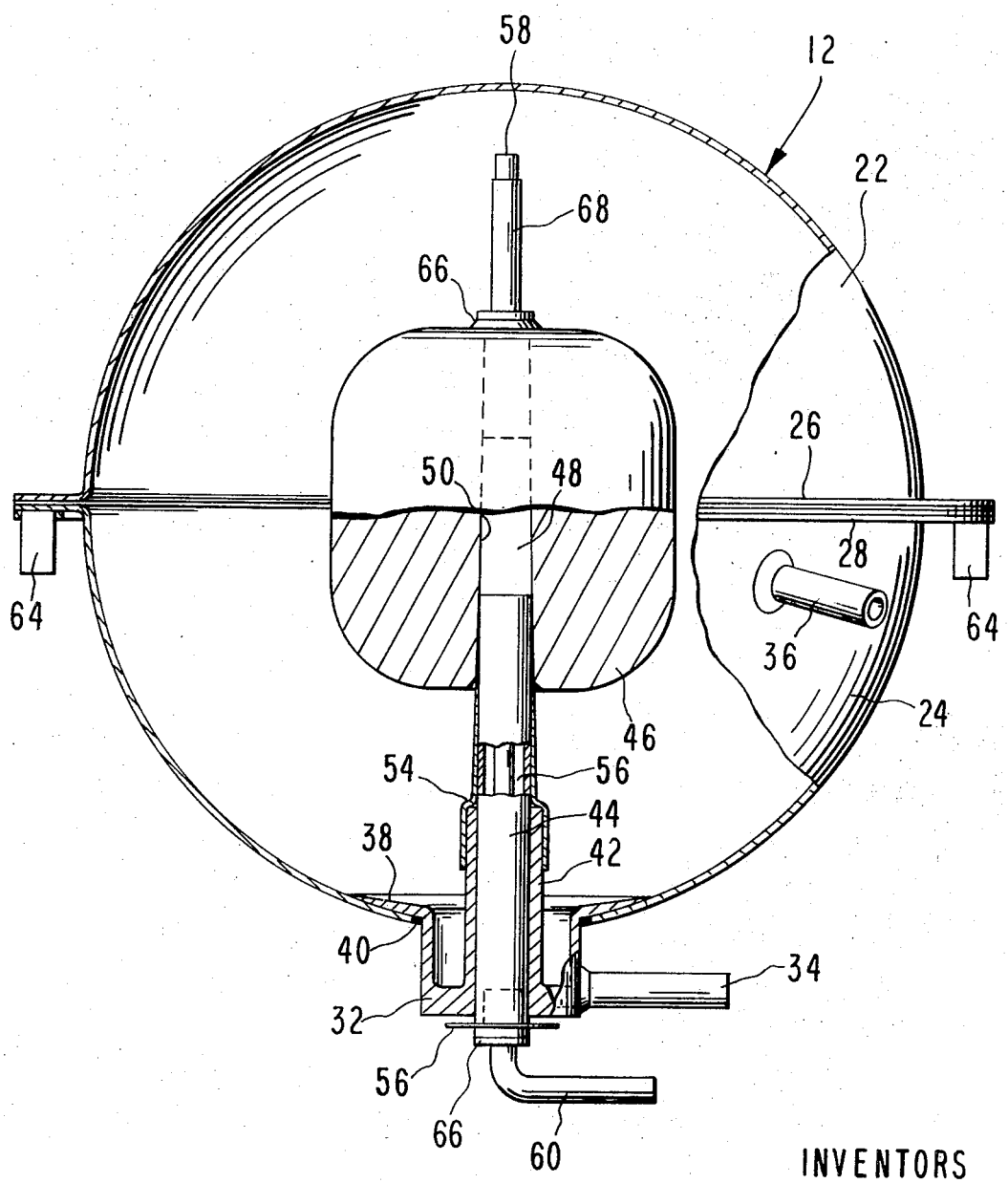

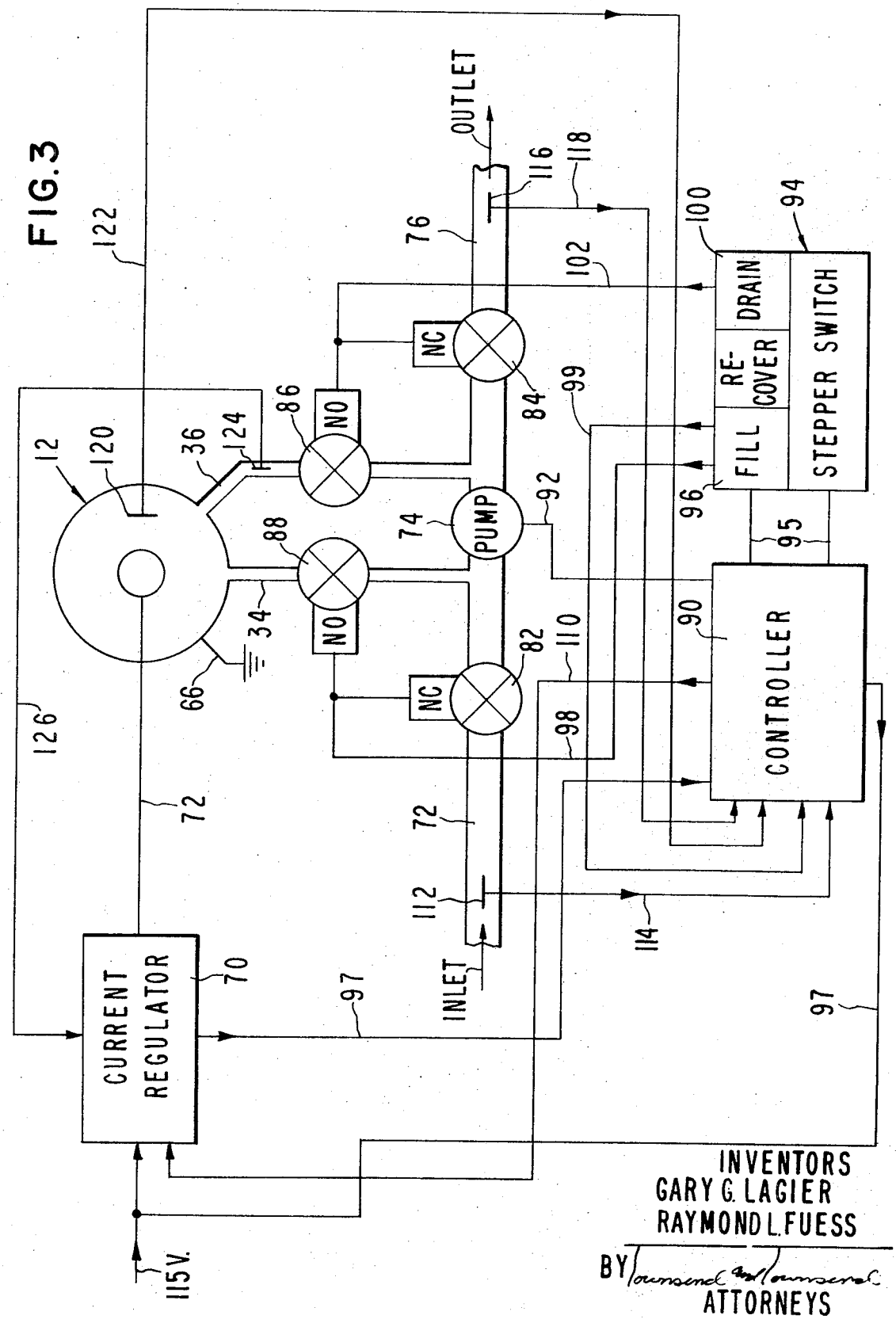

METAL RECOVERY APPARATUS AND METHOD

This invention relates to improvements in the recovery of metals from solutions and, more particularly, to apparatus and a method for more effectively recovering a metal, such as silver or the like, from a circulating solution.

While the present invention is suitable for the recovery of different types of metals in solutions, it is especially suitable for use in recovering silver from hypo solutions, a task which has utilized a number of different types of apparatuses and methods in the past. All of the conventional techniques of silver recovery are satisfactory but each has its drawbacks for one reason or another. The present invention provides an apparatus and method which increases the efficiency of silver recovery over that attained with conventional techniques and utilizes a globular space for receiving solution from which metal is to be recovered with the space being bounded by positive and negative electrodes to establish a potential gradient across which the solution passes as it circulates through the space, whereby current flows from one electrode to the other and the metal can be plated or deposited onto the negative electrode by an electrolytic action.

The apparatus of the invention includes a globular unit which encloses the space for receiving the solution containing the metal to be recovered. The globular unit also defines the negative electrode or cathode of the electrical circuit and the anode or positive electrode is mounted at the center of the globular unit to provide a substantially constant current density which can more easily control the electrolytic action. Moreover, the globular construction which provides maximum plating area or surface on which the metal to be recovered can be deposited for a given volume of space. The globular unit can be grounded so as to minimize injuries due to electrical shocks and, since the unit itself defines the cathode, no additional structure is needed to form this element of the circuit.

Another feature of the invention is the improved fluid circuitry which allows substantially uninterrupted circulation of the solution through the globular space after the latter has been filled to a predetermined level. With such a circuit, it is possible to achieve maximum separation of a metal from a solution in a given amount of time. The fluid circuitry can be automatically controlled by the use of sensors at various locations in the circuitry itself. Thus, manual functions required to operate the apparatus can be significantly minimized.

Still a further feature of the invention is the capability of controlling the electrical current for causing the deposition of metal on the cathode as well as controlling the volume rate of flow of the solution through the globular space. In this way, more effective control of the electrolytic action can be realized so as to assure maximum efficiency in the separation of metal from a solution.

The primary object of this invention is to provide an apparatus and method for separating a metal from a solution wherein the solution is directed through a globular space across which a potential gradient is established so that the metals can be deposited by an electrolytic action on a surface at one boundary of the space as the solution circulates therethrough.

Another object of this invention is to provide apparatus and a method of the type described wherein the globular space has a substantially spherical inner surface on which the metal to be separated is deposited, whereby the surface provides the maximum plating area for a given volume of space through which the solution circulates and the deposited metal can be retrieved by gaining access to the globular space.

Still a further object of this invention is to provide an apparatus and method of the aforesaid character which permits either the current density in the space or the volume rate of flow of solution through the space to be varied so as to provide greater control of the electrolytic action and thereby achieve a more efficient separation of a metal from a solution flowing through the space itself.

Other objects of this invention will become apparent as the following spacification progresses, reference being had to the accompanying drawings for an illustration of an embodiment of the apparatus.

In the drawings:

FIG. 2 is an enlarged, fragmentary, side elevational view, partly in section and partly broken away, of the metal-recovery chamber of the apparatus; and FIG. 3 is a schematic diagram of the apparatus including the fluid circuitry and the controlling means thereof.

Figure 1:
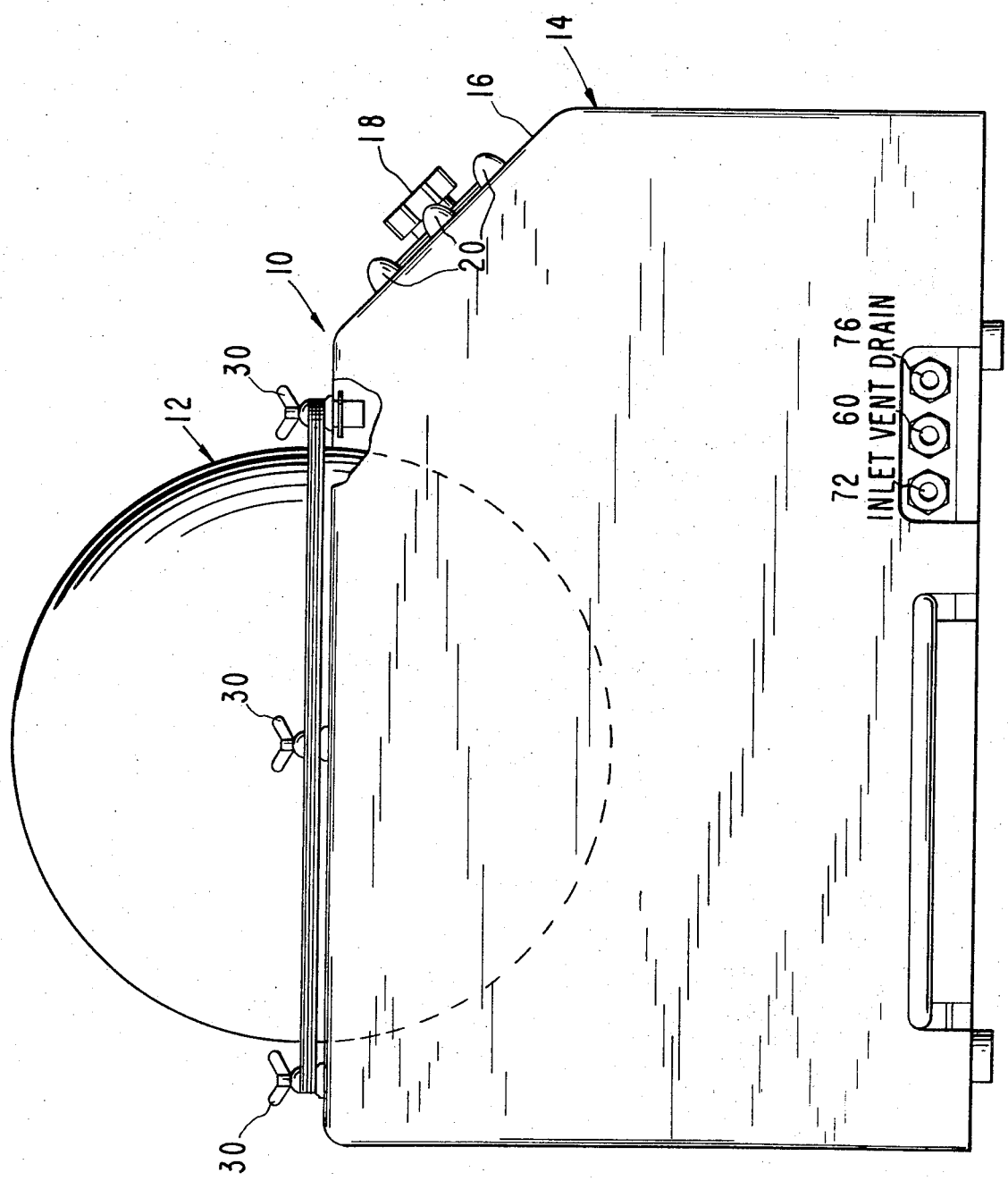
FIG. 1 is a side elevational view of the metal-recovery apparatus of this invention, parts being broken away to illustrate details of construction.

The metal-recovery apparatus which is the subject of this invention is broadly denoted by the numeral 10 and includes a globular recovery unit 12 mounted in an operative position on a housing 14 (FIG. 1) of electrically non-conducting material, the housing adapted to be supported on a surface, such as a floor or the like. Housing 14 has an inclined face 16 which provides a control panel for controls connected to the operating portions of the apparatus. For purposes of illustration, FIG. 1 shows a control knob 18 and a number of panel lights 20 for indicating various operative conditions of apparatus 10.

Unit 12 is shown in more detail in FIG. 2 and includes a pair of semi-spherical halves or members 22 and 24 having respective outer peripheral flanges 26 and 28 which mate with each other so that the members define a globular construction. A number of fasteners 30 (FIG. 1) are used to interconnect flanges 26 and 28 whereby to releasably secure member 22 to member 24. Preferably, member 24 is rigidly secured to housing 14 and extends inwardly thereof as shown in FIG. 1. Thus, to gain access to the interior of unit 12, fasteners 30 are manipulated so that member 22 can be separated from member 24.

Members 22 and 24 are formed from a suitable electrically conducting material, such as stainless steel or the like. The members have smooth inner surfaces and define the negative electrode or cathode of an electrical circuit which is used to separate a metal by an electrolysis action from a solution moving through unit 12. Thus, when a particular metal has been deposited by an electrolytic action on the inner surfaces of members 22 and 24, the metal can be recovered by separating member 22 from member 24 so as to gain access to the interior of unit 12. The metal can then be removed from the members in any suitable manner.

Member 24 has a lowermost, cup-shaped projection 32 which communicates therewith and defines a drain means for unit 12. A pipe 34, only a portion of which is shown in FIG. 2, extends laterally from projection 32 and communicates with the interior of member 24 to carry off drained liquid therefrom. Member 24 also has a pipe 36 communicating with the interior thereof and defining a fluid inlet therefor. Only a portion of pipe 36 is shown in FIG. 2. Thus, liquid entering pipe 36 can flow through unit 12 and out of the same through pipe 34. Pipe 36 has an interior nozzle (not shown) which is positioned so that fluid entering unit 12 will be directed along a path 90° to the axis of pipe 36 tangent to a circuit surrounding the central axis of unit 12, whereby the fluid will be caused to circulate through unit 12 as it is pumped thereinto. In this way, the fluid will be actively moved through the units to assure a more effective separation of a metal from the solution by electrolytic action.

Projection 32 is formed from an electrically non-conducting material; thus, it is not an integral part of member 24. It is fitted within a hole in the bottom of the member and has an annular upper portion 38 which rests on the inner surface of member 24 which surrounds the hole. An annular seal 40 is provided to seal the junction between member 24 and projection 32.

Projection 32 has a central tubular extension 42 which extends upwardly and into member 24 and provides a support for an electrically conducting pipe 44 which supports the anode 46 of unit 12. Pipe 44 has a conical, outer surface 48 which is complemental to the inner surface 50 of a bore extending through anode 46. The purpose of this conical shape is to provide a limiting means for holding anode 46 against downward movement beyond a certain distance along pipe 44 and to provide adequate electrical contact.

Anode 46 is formed from any suitable material, such as carbon or the like. It is in electrical contact with pipe 44. The shaft is surrounded by a suitable non-conductive sheath 54 in the region between the bottom extremity of anode 46 and the upper extremity of extension 42. Pipe 44 extends downwardly and outwardly of projection 32 and has a lug 56 thereon by means of which electrical contact can be made with pipe 44 and thereby anode 46.

A tube 56 of electrically conductive material is disposed within pipe 44 and is longer than the latter. Tube 56 is supported by bushings 66 in pipe 44, the bushings being made from a non-conductive material. Tube 56 has an open upper end 58 and a lateral lower portion 60 and operates to vent unit 12 to the atmosphere when a solution is directed thereinto. The upper portion of tube 56 is used to sense liquid level in unit 12. An insulating sheath 68 extends upwardly from upper bushing 66 to permit only a limited surface area of shaft 56 to be exposed. Tube 56 also allows air to enter unit 12 when the solution is drained therefrom.

Members 22 and 24 are electrically connected by conductors (not shown) to a current regulator 70 (FIG. 3) which receives electrical power from an external power source. Current regulator 70 is used to maintain a current output proportional to a command signal received when the current output is above a predetermined minimum value. When the current output is below this predetermined value or if current regulator 70 receives the appropriate command, the output of the current regulator is blocked.

The fluid circuitry of apparatus 10 is illustrated in FIG. 3 and includes a fluid inlet line 72 which is adapted to be connected to a fluid source such as a receptacle containing a solution having a quantity of silver to be recovered. Line 72 is connected to the inlet of a fluid pump 74 whose outlet is connected to an outlet line 76, the latter adapted to be connected to a fluid disposal means, such as a sewer line or the like. Inlet pipe 36 is coupled to outlet line 76 and outlet pipe 34 is connected to inlet line 72. Thus, pump 74 is disposed between pipes 34 and 36. A normally closed valve 82 is coupled across inlet line 72 and a normally closed valve 84 is coupled across outlet line 76. Normally open valves 86 and 88 are coupled with pipes 36 and 34, respectively. Pump 74 is used to fill unit 12 with a solution, circulate the solution therethrough, and drain the solution therefrom.

A controller 90 is provided to accept command signals from sensors to be described and, by means of such signals, to control current regulator 70, pump 74 and a stepper switch 94, all of which are electrically acuated and are electrically coupled by lead means to be described. Lead means 92 couples controller 90 with pump 74; lead means 95 couples controller 90 to stepper switch 94; and lead means 97 couples controller 90 with current regulator 70.

Stepper switch 94 operates to accept command signals and power from controller 90, to furnish output power to valves 82, 84, 86 and 88, and to provide an operating signal to controller 90 by way of lead means 99. Stepper switch 94 has a fill position 96 and is connected by lead means 98 to valves 82 and 88. It also has a drain position 100 connected by lead means 102 to valves 84 and 86. The stepper switch serves a sequencing and memory function and steps through three positions, namely, fill, recovery or separation and drain.

A fluid inlet sensor 112 in inlet line 72 is coupled with controller 90 through lead means 114. Sensor 112 provides an indication when a fluid is flowing through inlet line 72 toward pump 74.

An outlet sensor 116 is disposed in outlet line 76 and is coupled by lead means 118 to controller 90. Sensor 116 provides an indication when fluid is flowing through outlet line 76. A sensor 120 is disposed within unit 12 and is connected by lead means 122 to controller 90. Sensor 120 indicates the level of the fluid within unit 12.

A solution condition sensor is disposed in pipe 36 and is coupled by lead means 136 to current regulator 70. This sensor provides a control signal by means of which a command can be directed to the current regulator to cause it to supply a current depending upon the concentration of a metal in the solution circulating through unit 12.

In operation, apparatus 10 is connected in the manner shown in FIG. 3 with inlet line 72 coupled to a source of liquid having a metal in the solution, such as a hypo solution containing silver to be retrieved. Valves 82 and 84 will normally be closed and valves 86 and 88 will normally be open. Outlet line 76 will be coupled to a fluid disposal means.

Stepper switch 94 is manually set to the fill position and controller 90 is given a "start" command. These actions cause the opening of valve 82, the closing of valve 88, and the supply of power to current regulator 70 and controller 90. When this occurs, pump 74 is actuated and the solution liquid is caused to flow into unit 12 and to fill the same to a predetermined level as determined by sensor 120. When this level has been reached, a signal will be sent from sensor 120 to controller 90 which will advance switch 94 to the recover position to operate to close valve 82 and open valve 88.

Pump 74 will continue to operate and as it does, it causes the solution to circulate in the closed circuit including the following: pump 74, pipe 78, valve 86, pipe 36, unit 12, pipe 34, valve 88, and pipe 80. The liquid enters unit 12 in a direction to cause circulation of the liquid therewithin. When stepper switch 94 goes into the recover position, current regulator 70 establishes the potential gradient across the space between the electrodes of unit 12 and thereby supplies a maximum current thereto proportional to the signal from solution condition sensor 124. This operating mode continues until current in unit 12 falls below the aforesaid predetermined minimum value.

As the solution circulates within unit 12, the metal in the solution will be removed therefrom and deposited on the inner surfaces of members 22 and 24.

When the predetermined minimum current value has been reached, a signal from current regulator 70 is directed by lead means 97 to controller 90 which, in turn, advances stepper switch 94 to the drain position 100. Valve 84 is then opened and valve 86 is closed, whereupon pump 74 continues to operate to empty unit 12 of solution and to direct the solution through outlet line 76. Sensor 116 directs a control signal to controller 90 when line 76 is empty to thereby cause the controller to advance the stepper switch back to the fill position 96. The operating sequence can then be repeated to recover metal from a second volume of the solution.

If sensor 112 indicates no solution passing through inlet line 72 when stepper switch 94 is in the fill position, controller 90 falls into a "release" mode and all power to control valves 82, 84, 86 and 88 is removed. Also, power to pump 74 is removed. When the source of the solution is replenished, controller 90 is manually given a "reset" signal until the fill line is primed; then, normal, automatic batch processing will continue.

To facilitate the connection of inlet pipe 72 and outlet pipe 76, apparatus 10 is provided with side openings as shown in FIG. 1 to connect the inlet and outlet pipes 72 and 76 directly to the source of solution and the fluid disposal means, respectively. Lateral portion 60 of tube 56 is also disposed adjacent to the connections for inlet and outlet pipes 72 and 76.

What is claimed is:

1. Apparatus for recovering a metal from a solution by an electrolytic action comprising: a fluid circuit including a fluid receiving unit defining a generally spherical space, with the unit being of an electrically conductive material to define a first electrode and valve means coupled with said fluid circuit for controlling the flow of a solution into, through and out of the unit; means defining a second electrode within the unit; means coupled with said unit and insulated therefrom for supporting said second electrode, whereby a potential gradient can be established across said space to permit an electrical current to flow between the electrodes; means coupled with the electrodes for establishing a potential gradient therebetween; and means coupled with the valve means for actuating the same in accordance with a predetermined sequence.

2. Apparatus as set forth in claim 1, wherein said unit comprises a pair of generally semi-spherical members, and means on said members for releasably interconnecting the same.

3. Apparatus as set forth in claim 1, wherein is provided means for venting the space as a solution is directed thereinto.

4. Apparatus as set forth in claim 1, wherein said fluid circuit includes a fluid pump, there being an inlet line connected to the inlet of the pump and an outlet line connected to the outlet of the pump, and a pair of valves coupled to the pump at the inlet and outlet thereof, respectively, said valves being controlled by said controlling means to cooperate with said valve means to control the flow of a solution into, through and out of said circuit.

5. Apparatus as set forth in claim 1, wherein said electrode is substantially equally spaced from all locations on said inner surface of the unit.

6. Apparatus as set forth in claim 1, wherein is included a tubular shaft carried by the unit and extending into the space, the inner end of the shaft being open to vent the interior of the unit to a region exteriorly thereof, said second electrode being mounted on the shaft centrally of the unit.

7. Apparatus as set forth in claim 1, wherein is included means coupled with the unit for sensing the level of solution in said space.

8. In apparatus for recovering a metal from a solution by an electrolytic action: a fluid-receiving unit having a generally spherical inner surface and being formed from an electrically conductive material; an electrode which is substantially equally spaced from all locations on said inner surface of said unit; and means coupled with the unit and electrically insulated therefrom for mounting the electrode within the space, there being conductor means for connecting the electrode to a source of electrical power.

9. An apparatus as set forth in claim 8, wherein said mounting means includes a pipe, and means securing the pipe to the unit and maintaining the pipe out of electrical contact therewith.

10. An apparatus as set forth in claim 9, wherein the pipe has an open inner end disposed adjacent to the upper extremity of the space to vent the same to a region externally of the unit.

11. An apparatus as set forth in claim 8, wherein said unit includes a pair of generally semi-spherical members, and means on the members for releasably interconnecting the same.

12. Apparatus for recovering a metal from a solution by an electrolytic action comprising: a fluid circuit including a closed, fluid-receiving unit having a generally spherical inner space and defining a first electrode, an inlet pipe and an outlet pipe coupled with the unit, said inlet and outlet pipes being coupled with the outlet and inlet, respectively, of a fluid pump; a valve for each of the inlet and outlet pipes, respectively; inlet means coupled with the inlet of the pump for controllably directing a solution thereto; outlet means coupled with the outlet of the pump for controllably directing a solution away from the circuit; a second electrode; means mounting the second electrode at a central location within the space; means coupled with the electrodes for establishing a potential gradient therebetween; and means coupled with the valves for actuating the same to cause a solution to be directed into the circuit, to circulate therethrough, and be discharged therefrom in accordance with a predetermined sequence.

13. Apparatus as set forth in claim 12, wherein is provided a first sensor coupled with the inlet means, a second sensor coupled with the outlet means, sand a third sensor coupled with said fluid circuit, said sensors being connected to said controlling means for actuating the same in accordance with said sequence.

* * * * *